(12) United States Patent
Takemoto et al.

(10) Patent No.: US 10,949,942 B2
(45) Date of Patent: Mar. 16, 2021

(54) IMAGE PROCESSING APPARATUS, IMAGE PROCESSING METHOD, AND IMAGE PROCESSING PROGRAM

(71) Applicants: FUJIFILM CORPORATION, Tokyo (JP); FUJI XEROX CO., LTD., Tokyo (JP)

(72) Inventors: Kosei Takemoto, Kanagawa (JP); Kazuyuki Itagaki, Kanagawa (JP); Takashi Nagao, Kanagawa (JP)

(73) Assignees: FUJIFILM CORPORATION, Tokyo (JP); FUJI XEROX CO., LTD., Tokyo (JP)

( * ) Notice: Subject to any disclaimer, the term of this patent is extended or adjusted under 35 U.S.C. 154(b) by 146 days.

(21) Appl. No.: 16/134,974

(22) Filed: Sep. 19, 2018

(65) Prior Publication Data

US 2019/0019270 A1 Jan. 17, 2019

Related U.S. Application Data

(63) Continuation of application No. PCT/JP2017/002573, filed on Jan. 25, 2017.

(30) Foreign Application Priority Data

Mar. 24, 2016 (JP) .............................. JP2016-060523

(51) Int. Cl.
*G06T 1/20* (2006.01)
*G06T 7/162* (2017.01)
(Continued)

(52) U.S. Cl.
CPC .................. *G06T 1/20* (2013.01); *G06T 1/60* (2013.01); *G06T 7/11* (2017.01); *G06T 7/162* (2017.01);
(Continued)

(58) Field of Classification Search
CPC ... G06T 7/162; G06T 7/11; G06T 1/60; G06T 1/20
See application file for complete search history.

(56) References Cited

U.S. PATENT DOCUMENTS

| 7,554,550 | B2* | 6/2009 | White | G06T 1/60 |
| | | | | 345/418 |
| 2007/0247466 | A1* | 10/2007 | Kumazawa | G06T 1/20 |
| | | | | 345/506 |

(Continued)

FOREIGN PATENT DOCUMENTS

| JP | 2008-181386 A | 8/2008 |
| JP | 2009-54001 A | 3/2009 |

(Continued)

OTHER PUBLICATIONS

Google Scholar Search Report.*

(Continued)

*Primary Examiner* — Qun Shen
(74) *Attorney, Agent, or Firm* — Solaris Intellectual Property Group, PLLC (57) ABSTRACT

A computer that functions as an image processing apparatus that includes a plurality of processor cores extracts, from an object group in which a plurality of image processing modules for executing image processing are connected to each other in a directed acyclic graph form, a plurality of image processing modules that are serially connected to each other, and causes the same processor core among the plurality of processor cores to execute image processing in each of the plurality of extracted image processing modules.

8 Claims, 6 Drawing Sheets

(51) Int. Cl.
*G06T 7/11* (2017.01)
*G06T 1/60* (2006.01)
*G06T 3/40* (2006.01)
*G06T 11/00* (2006.01)

(52) U.S. Cl.
CPC ............... *G06T 3/40* (2013.01); *G06T 11/001* (2013.01); *G06T 2207/20021* (2013.01); *G06T 2207/20072* (2013.01); *G06T 2210/52* (2013.01)

(56) References Cited

U.S. PATENT DOCUMENTS

| | | | |
|---|---|---|---|
| 2008/0183792 A1* | 7/2008 | Inoue | G06F 17/16 708/520 |
| 2013/0257882 A1* | 10/2013 | Ooguni | G06T 1/20 345/505 |
| 2014/0184623 A1 | 7/2014 | Frascati et al. | |
| 2015/0046677 A1* | 2/2015 | Moloney | G06T 1/60 712/29 |
| 2016/0267622 A1* | 9/2016 | Brothers | H04N 9/045 |
| 2016/0314555 A1* | 10/2016 | Zhu | G06T 1/60 |
| 2017/0249716 A1* | 8/2017 | Meixner | G06T 1/20 |

FOREIGN PATENT DOCUMENTS

| | | |
|---|---|---|
| JP | 2012-118932 A | 6/2012 |
| JP | 2013-20580 A | 1/2013 |
| JP | 2013-501296 A | 1/2013 |
| JP | 2014-164664 A | 9/2014 |

OTHER PUBLICATIONS

International Search Report issued in International Application No. PCT/JP2017/002573 dated Mar. 7, 2017.
Written Opinion of the ISA issued in International Application No. PCT/JP2017/002573 dated Mar. 7, 2017.
International Preliminary Report on Patentability issued in International Application No. PCT/JP2017/002573 dated Nov. 7, 2017.

* cited by examiner

IMAGE PROCESSING APPARATUS, IMAGE PROCESSING METHOD, AND IMAGE PROCESSING PROGRAM

CROSS-REFERENCE TO RELATED APPLICATIONS

This application is a continuation application of International Application No. PCT/JP2017/002573, filed Jan. 25, 2017, the disclosure of which is incorporated herein by reference in its entirety. Further, this application claims priority from Japanese Patent Application No. 2016-060523, filed Mar. 24, 2016, the disclosure of which is incorporated herein by reference in its entirety.

BACKGROUND

1. Technical Field

A technique of the present disclosure relates to an image processing apparatus, an image processing method, and an image processing program.

2. Related Art

In the related art, a technique that performs image processing according to an object group in which a plurality of objects for executing image processing are connected in a directed acyclic graph (DAG) form is known (see JP2012-118932A).

Further, a technique that performs parallel processing using a plurality of processors according to a task flow graph in a DAG form is known (see JP2014-164664A). In this technique, in a case where a first task and a second task that is a preceding task of the first task are allocated to different processors, execution of the first task is in a waiting state until output data of the second task can be referred to by a first processor to which the first task is allocated.

In addition, a technique that predicts that a thread is transferred from a first processor core to a second processor core and transfers data relating to the thread from the first processor core to the second processor core is known (see JP2013-501296A). In this technique, after the data relating to the thread is transferred from the first processor core to the second processor core, the thread is transferred from the first processor core to the second processor core.

SUMMARY

However, in a case where processing is executed by a plurality of processor cores, as an example of a schedule principle of determining which processor core a thread that is a process execution unit is to be executed on, a greedy schedule is known. The greedy schedule refers to a schedule principle for preventing a thread that terminates execution of a process from being in an idle state, in which in a case where there is a processor core that does not execute a process, the processor core immediately executes the next process. Accordingly, in the greedy schedule, there is a problem in that respective processes that are consecutively executed with reference to regions on the same memory are executed by different processor cores.

The technique disclosed in JP2012-118932A does not consider such a problem. Further, in the techniques disclosed in JP2014-164664A and JP2013-501296A), it takes time for transferring (copying) data between different processor cores. Further, during the time when the data is transferred, execution of a process is suspended, and consequently, there is a case that it is not possible to perform image processing at high speed.

The technique of the present disclosure provides an image processing apparatus, an image processing method, and an image processing program capable of performing image processing at high speed, compared with a case where a plurality of types of image processing are executed by different processor cores.

According to a first aspect of the invention, there is provided an image processing apparatus that includes a plurality of processor cores, comprising: an extraction section that extracts, from an object group in which a plurality of objects for executing image processing are connected to each other in a directed acyclic graph form, a plurality of objects that are serially connected to each other; a division section that divides an image, which is an execution target of the image processing in the plurality of objects extracted by the extraction section, into a plurality of divided regions, and that divides the image processing into a plurality of tasks corresponding to each of the divided regions, wherein the division section assigns a dependency relationship in accordance with a type of image processing between a task corresponding to an object connected at a front stage in the plurality of objects that are serially connected to each other, among the plurality of tasks, and a task corresponding to an object connected at a rear stage in the plurality of objects that are serially connected to each other, among the plurality of tasks; and an execution section that causes a processor core, which is the same processor core, among the plurality of processor cores, and is different among the plurality of tasks, to execute each of the plurality of tasks obtained by being divided by the division section.

According to a second aspect of the invention, in the image processing apparatus according to the first aspect of the invention, wherein the extraction section extracts, as the plurality of objects that are serially connected to each other, a plurality of objects for which a number of objects connected at the front stage is 0 or 1.

According to a third aspect of the invention, in the image processing apparatus according to the first or second aspect of the invention, the execution section, in a unit of a divided region formed by dividing an image that is an execution target of the image processing in the plurality of objects extracted by the extraction section into a plurality of regions, may cause the same processor core to execute image processing in each of the plurality of extracted objects, and may cause a different processor core to execute image processing in each of the plurality of objects extracted for each divided region.

According to a fourth aspect of the invention, wherein the division section divides the image that is the execution target of the image processing in the plurality of objects extracted by the extraction section into the plurality of divided regions, a number of the plurality of divided regions being equal to or less than a number of the processor cores.

According to a fifth aspect of the invention, the image processing apparatus according to the third aspect of the invention may further comprises: wherein the division section that divides the image that is the execution target of the image processing in the plurality of objects extracted by the extraction section into a plurality of divided regions having a size that is equal to or smaller than a capacity of a cache memory included in a calculation section that executes the image processing.

According to a sixth aspect of the invention, in the image processing apparatus according to any one of the first to fifth aspects of the invention, the plurality of processor cores may include a cache memory used for the image processing.

According to a seventh aspect of the invention, there is provided an image processing method using an image processing apparatus that includes a plurality of processor cores, the method comprising: extracting, from an object group in which a plurality of objects for executing image processing are connected to each other in a directed acyclic graph form, a plurality of objects that are serially connected to each other; dividing an image, which is an execution target of the image processing in the plurality of objects extracted, into a plurality of divided regions; dividing the image processing into a plurality of tasks corresponding to each of the divided regions; assigning a dependency relationship in accordance with a type of image processing between a task corresponding to an object connected at a front stage in the plurality of objects that are serially connected to each other, among the plurality of tasks, and a task corresponding to an object connected at a rear stage in the plurality of objects that are serially connected to each other, among the plurality of tasks; and causing a processor core, which is the same processor core, among the plurality of processor cores, and is different among the plurality of tasks, to execute each of the plurality of tasks obtained by being divided.

According to an eighth aspect of the invention, there is provided an image processing program for causing a computer to function as the extraction section, the division section and the execution section of the image processing apparatus according to any one of the first to sixth aspects of the invention.

According to embodiments of the invention, compared with a case where a plurality of types of image processing is executed by different processor cores, it is possible to perform image processing at high speed.

BRIEF DESCRIPTION OF THE DRAWINGS

Exemplary embodiments according to the technique of the present disclosure will be described in detail based on the following figures, wherein.

DESCRIPTION

Hereinafter, embodiments for executing the technique of the present disclosure will be described in detail with reference to the accompanying drawings.

First, a configuration of a computer 10 that functions as an image processing apparatus will be described with reference to FIG. 1. The computer 10 may be a computer embedded in an image handling device that performs image processing inside a copying machine, a printer, a facsimile machine, a multifunction machine that performs functions of these machines, a scanner, or the like. Further, the computer 10 may be an independent computer such as a personal computer (PC), or may be a computer embedded in a portable device such as a personal digital assistant (PDA) or a mobile phone.

Figure 1:
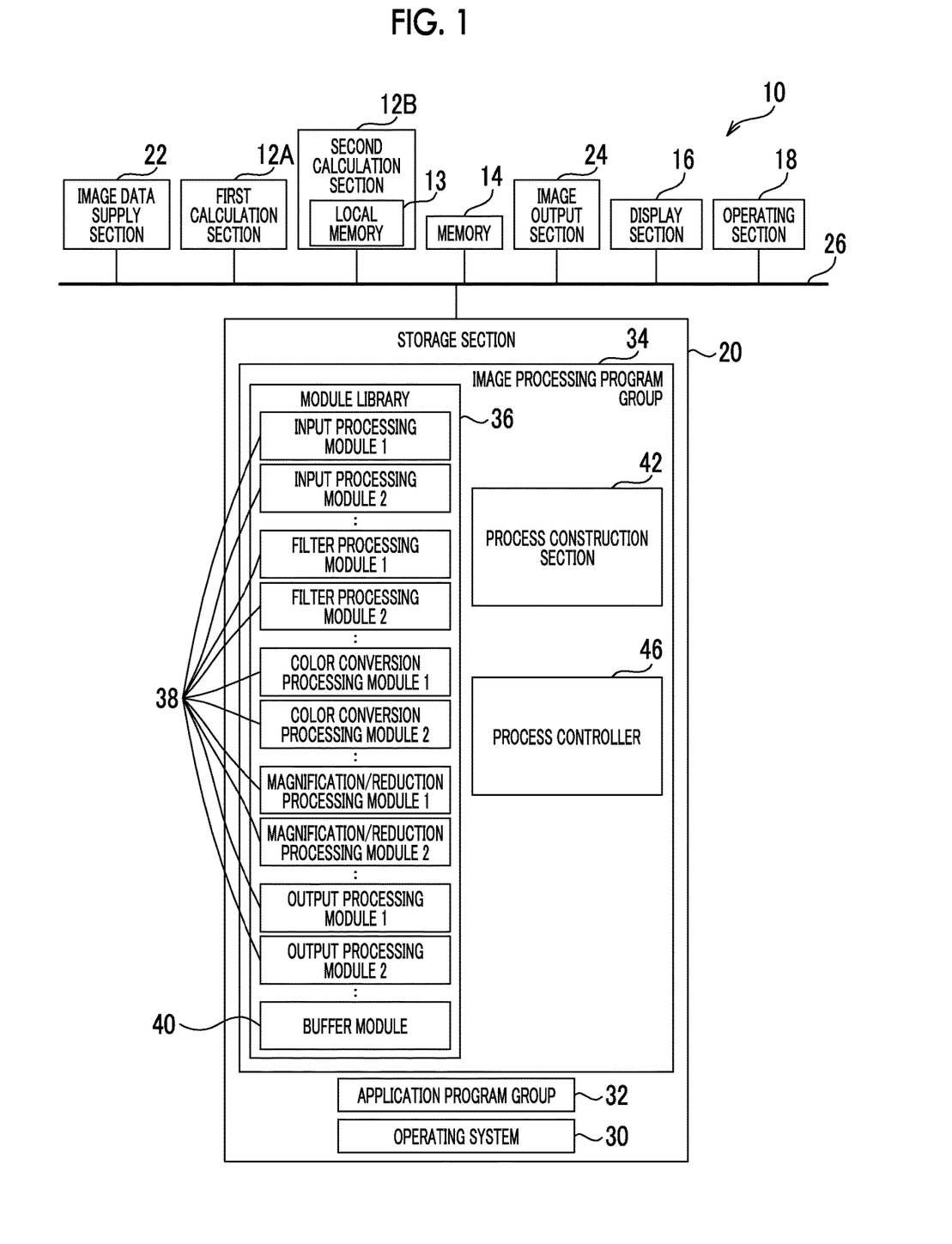
FIG. 1 is a block diagram showing an example of a configuration of a computer that functions as an image processing apparatus according to an embodiment.

As shown in FIG. 1, the computer 10 according to this embodiment includes a first calculation section 12A, a second calculation section 12B, a memory 14, a display section 16, an operating section 18, a storage section 20, an image data supply section 22, and an image output section 24. Further, the respective sections of the first calculation section 12A, the second calculation section 12B, the memory 14, the display section 16, the operating section 18, the storage section 20, the image data supply section 22, and the image output section 24 are connected to each other through a bus 26.

The first calculation section 12A according to this embodiment is a main processor of the computer 10, and for example, is a central processing unit (CPU). Further, the second calculation section 12B according to this embodiment is a graphics processing unit (GPU) having a local memory 13 therein, for example. In addition, the second calculation section 12B according to the embodiment includes a cache memory and a plurality of (in this embodiment, four) processor cores. The second calculation section 12B may be the same type of CPU as in the first calculation section 12A, or may be a different type of CPU. Further, the second calculation section 12B may be a GPU provided in the first calculation section 12A. Further, the second calculation section 12B may be a GPU that does not have the local memory 13 therein. In addition, the first calculation section 12A and the second calculation section 12B may be a calculator of a field programmable gate array (FPGA) or the like.

The memory 14 is non-volatile storage means for temporarily storing data in the first calculation section 12A and the second calculation section 12B. In a case where image processing is performed by the second calculation section 12B according to this embodiment, the first calculation section 12A transmits image data stored in the memory 14 or a storage region of the storage section 20 to the second calculation section 12B through the bus 26. Further, the second calculation section 12B stores image data transmitted from the first calculation section 12A in the local memory 13, and performs image processing with respect to the stored image data. The second calculation section 12B may directly read out image data stored in the memory 14 or the storage section 20 to perform image processing.

In a case where the computer 10 is embedded in the above-mentioned image handling device, as the display section 16 and the operating section 18, a display panel such as a liquid crystal display (LCD) provided in the image handling device may be employed. Further, in a case where the computer 10 is an independent computer, as the display section 16 and the operating section 18, for example, a display, a keyboard, a mouse, or the like connected to the computer 10 may be employed. In addition, the display section 16 and the operating section 18 may be a touch panel display in which a touch panel and a display are integrally formed, for example. Further, as the storage section 20, a hard disk drive (HDD), a solid state drive (SSD), or a non-volatile storage medium such as a flash memory may be employed.

The image data supply section 22 may be any device that is able to provide image data that is a processing target, which may be, for example, an image reading section that reads out an image recorded on a recording material such as a sheet or a photographic film and outputs image data. Further, as the image data supply section 22, for example, a reception section that receives image data from an external device through a communication line, the image storage section (the memory 14 or the storage section 20) that stores image data, and the like are applied.

The image output section 24 may be any device that is able to output image data obtained through image processing or an image expressed from the image data obtained through the image processing, which may be, for example, an image recording section that records an image expressed from image data on a recording material such as a sheet or a photosensitive material. Further, as the image output section 24, a display section (display section 16) that displays an image expressed from the image data on a display or the like, or a writing device that writes image data on a recording medium such as a compact disc read only memory (CD-ROM) may be employed. Further, as the image output section 24, a transmission section that transmits image data obtained through image processing to an external device through a communication line may be employed. Further, the image output section 24 may be an image storage section (the memory 14 or the storage section 20) that stores image data obtained through image processing.

As shown in FIG. 1, a variety of programs executed by the first calculation section 12A and the second calculation section 12B are stored in the storage section 20. In the storage section 20, a program of an operating system 30 that performs management of resources, management of execution of programs, communication between the computer 10 and the external device, and the like is stored as a part of the variety of programs. Further, in the storage section 20, an image processing program group 34 for causing the computer 10 to function as an image processing apparatus is stored as a part of the variety of programs. Further, in the storage section 20, an application program group 32 (hereinafter, referred to as an "application 32") including a variety of application programs for causing the image processing apparatus to perform desired image processing is stored as a part of the variety of programs.

The image processing program group 34 refers to programs made to reduce burden on developing image processing programs executed by the above-described image handling device, portable device, PC, or the like. Further, the image processing program group 34 refers to programs made to be commonly executable in various devices (platforms) such as the above-described image handling device, portable device, PC, or the like.

The image processing apparatus realized by the image processing program group 34 constructs an image processing DAG 50A (of which details will be described later) that performs image processing instructed by the application 32 in accordance with a construction instruction from the application 32. Further, the image processing apparatus executes processing in the image processing DAG 50A in accordance with an execution instruction from the application 32. Thus, the image processing program group 34 provides an interface for instructing the construction of the image processing DAG 50A for performing desired image processing or instructing the execution of the image processing in the constructed image processing DAG 50A to the application 32.

With such a configuration, for example, in a case where any device that needs to perform image processing therein is newly developed, development of a program for performing the image processing may be performed as described hereinafter. In this case, the application 32 that causes the image processing program group 34 to perform the image processing necessary in the device using the interface may be developed. Accordingly, a developer does not need to develop a new program for actually performing image processing, which leads to reduction of burden on the developer.

Next, the image processing program group 34 according to this embodiment will be described in detail. As shown in FIG. 1, the image processing program group 34 includes a module library 36, a program of a process construction section 42, and a program of a process controller 46.

In the module library 36, programs of a plurality of types of image processing modules 38 that perform predetermined different types of image processing are registered, respectively. The image processing may include, for example, an input process, a filtering process, a color conversion process, a magnification or reduction process (see a "magnification/reduction process" in FIG. 1), a skew angle detection process, an image rotation process, an image synthesis process, an output process, and the like.

Further, in the module library 36, an image processing module 38 having the same type of image processing and different details of image processing to be executed is also registered. In FIG. 1, such an image processing module is divided into "module 1" and "module 2", which are distinguished from each other using numerical characters attached to the ends thereof. For example, with respect to the image processing module 38 that performs the magnification or reduction process, an image processing module 38 that performs a reduction process of reducing vertical and horizontal sizes of an image by 50% by thinning out input image data every other pixel in respective directions of a horizontal direction and a vertical direction is prepared. Further, for example, with respect to the image processing module 38 that performs the magnification or reduction process, an image processing module 38 that performs a magnification or reduction process at a designated magnification or reduction ratio with respect to input image data is prepared, for example.

Further, for example, with respect to the image processing module 38 that performs the color conversion process, an image processing module 38 that converts an image in an RGB (red, green, blue) color space into an image in a CMYK (cyan, magenta, yellow, key-plate (black)) color space and an image processing module 38 that converts an image in a CMYK color space into an image in an RGB color space are prepared. Further, for example, with respect to the image processing module 38 that performs the color conversion process, an image processing module 38 that converts an image in an RGB color space into an image in a YCbCr color space and an image processing module 38 that converts an image in a YCbCr color space into an image in an RGB color space are prepared, for example.

Further, in the module library 36, a buffer module 40 that includes a storage region (buffer) for storing image data is also registered.

The process construction section 42 according to this embodiment constructs an image processing DAG 50A in the form of a DAG in accordance with an instruction from the application 32. In the image processing DAG 50A, for example, as shown in FIG. 2A, one or more image processing modules 38 are connected to each other through the buffer module 40 disposed in at least one of a front stage and a rear stage of each image processing module 38.

Each image processing module 38 is an example of an object that executes image processing with respect to input image data and outputs output image data. Further, the image processing DAG 50A is an example of an object group in which a plurality of image processing modules 38 are connected to each other. Further, in the example shown in FIG. 2A, it is shown that an image processing module 38 to which another image processing module 38 is connected at a front stage thereof through the buffer module 40 is in a state of being capable of executing its image processing in a case where image processing in the front-stage image processing module 38 is terminated. In addition, it is shown that an image processing module 38 to which a plurality of image processing modules 38 are connected at a front stage thereof through the buffer module 40 is in a state of being capable of executing its image processing in a case where entire image processing in the plural front-stage image processing modules 38 is terminated.

Figure 2A:
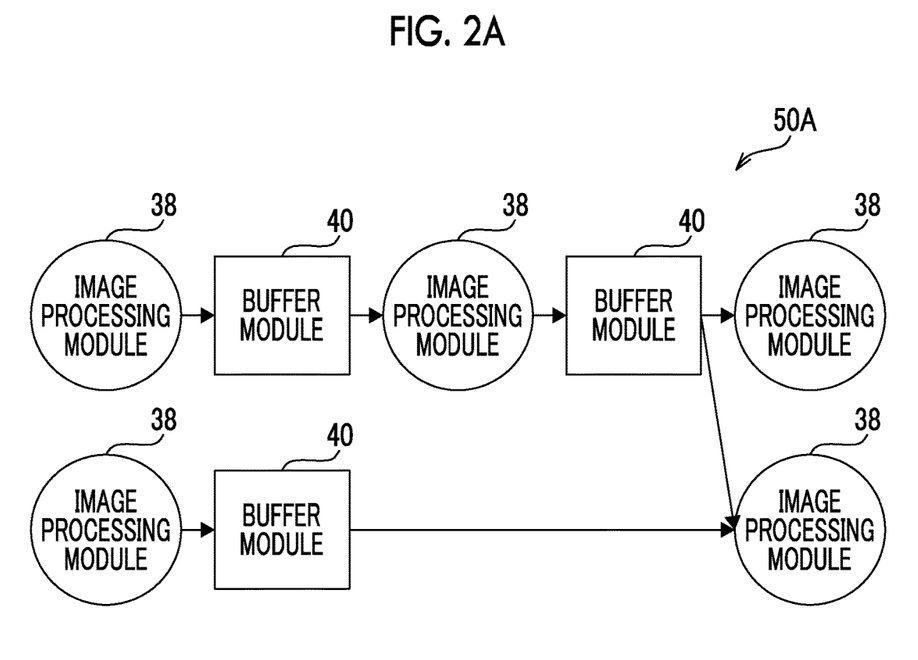
FIG. 2A is a schematic view showing an example of an image processing DAG.
Figure 2B:
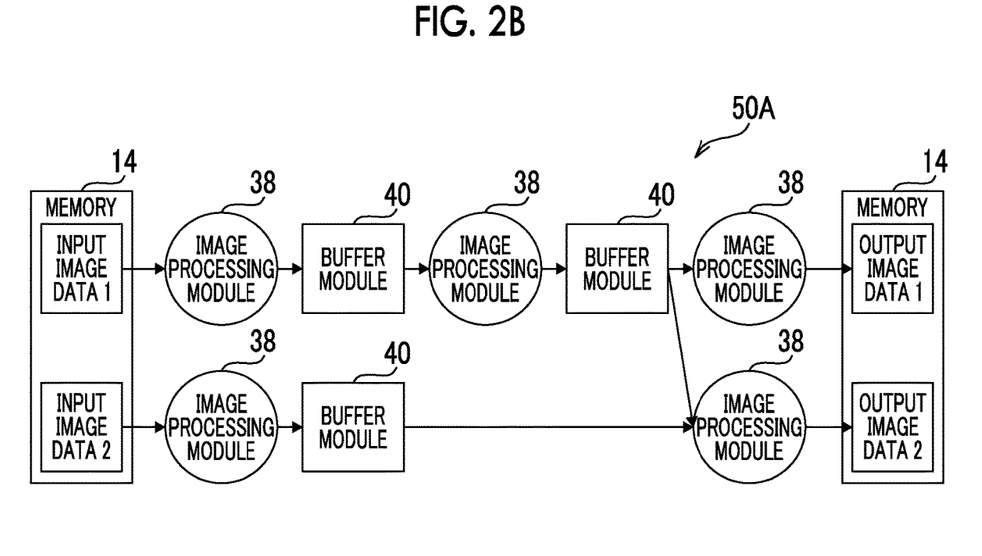
FIG. 2B is a schematic view in a case where an input/output memory is additionally provided in the image processing DAG.

Further, in FIG. 2A, a DAG in which only the respective modules are connected to each other in a processing order is shown, but in a case where the DAG is actually executed, as shown in FIG. 2B, image data stored in the memory 14 is input and image processing is performed in accordance with the DAG. Finally, a processing result of processed image data or the like is stored in the memory 14. In a case where image processing executed by each image processing module 38 is executed by the second calculation section 12B, the memory 14 shown in FIG. 2B becomes the local memory 13.

Figure 3:
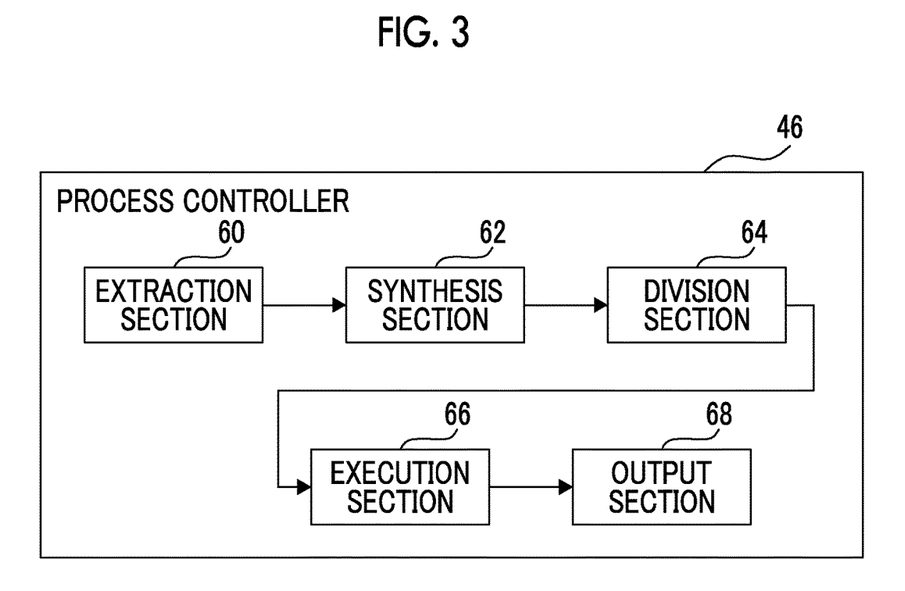
FIG. 3 is a block diagram showing an example of a functional configuration of a process controller according to an embodiment.

Next, a functional configuration of a process controller 46 according to this embodiment will be described with reference to FIG. 3. As shown in FIG. 3, the process controller 46 includes an extraction section 60, a synthesis section 62, a division section 64, an execution section 66, and an output section 68.

The extraction section 60 according to this embodiment extracts a plurality of image processing modules 38 that are serially connected to each other from the image processing DAG 50A constructed by the process construction section 42. In this embodiment, the extraction section 60 extracts a plurality of image processing modules 38 for which the number of image processing modules 38 connected at a front stage thereof is 0 or 1, as the plurality of image processing modules 38 that are serially connected to each other.

The synthesis section 62 according to this embodiment constructs an image processing DAG 50B in which the plurality of image processing modules 38 extracted by the extraction section 60 are replaced with a synthesis module 52 that contains the plurality of extracted image processing modules 38. Processes of the extraction section 60 and the synthesis section 62 will be described in detail with reference to FIGS. 4 to 7. FIGS. 4 to 7 respectively show examples of the image processing DAG 50B after processing in the synthesis section 62.

Figure 4:
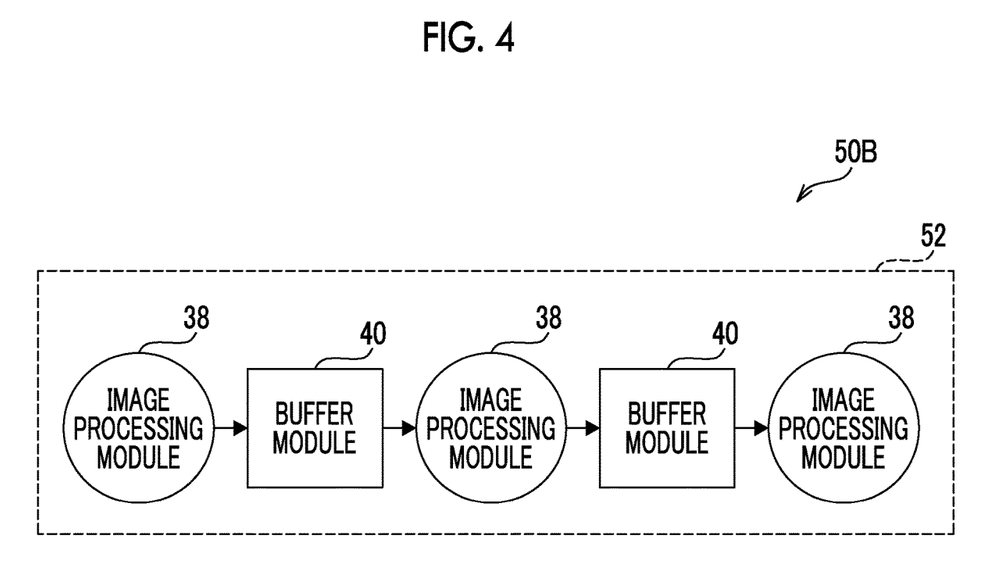
FIG. 4 is a schematic view for illustrating an example of a synthesis module according to an embodiment.

In a case where three image processing modules 38 are connected to each other in a line through the buffer modules 40, as shown in FIG. 4, the extraction section 60 extracts the three image processing modules 38 that are serially connected to each other. Further, the synthesis section 62 constructs the image processing DAG 50B in which the three image processing modules 38 extracted by the extraction section 60 are replaced with the synthesis module 52 that contains the extracted three image processing modules 38.

Figure 5:
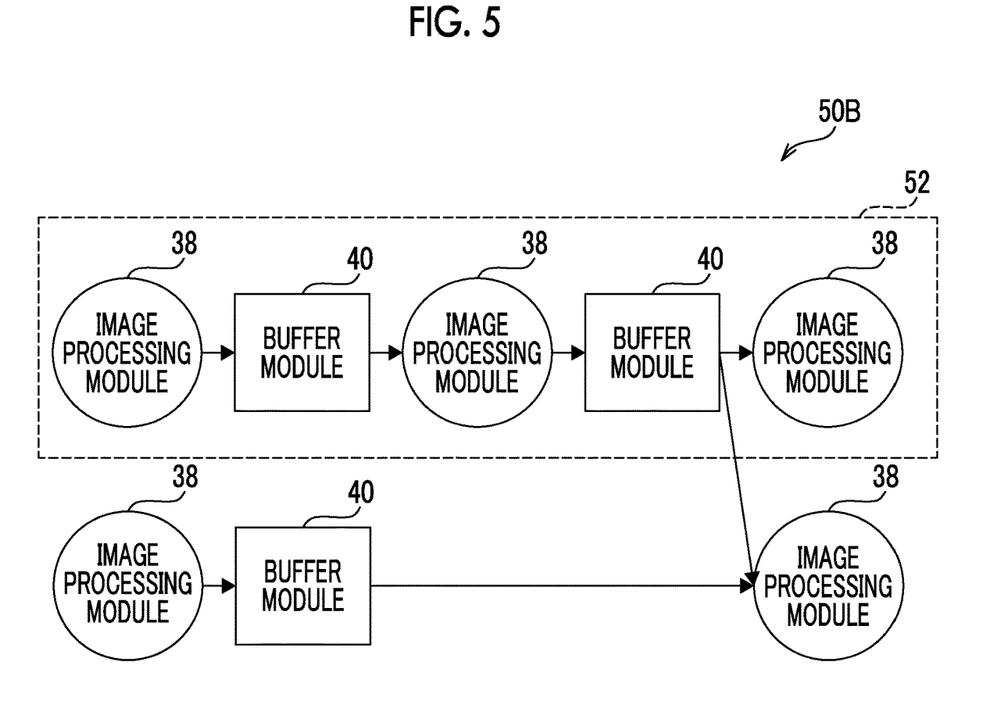
FIG. 5 is a schematic view for illustrating an example of a synthesis module according to an embodiment.

On the other hand, five image processing modules 38 are connected to each other through the buffer modules 40, as shown in FIG. 5, the extraction section 60 extracts three image processing modules 38 that are surrounded by a dash line in FIG. 5 and are serially connected to each other. Further, the synthesis section 62 constructs the image processing DAG 50B in which the three image processing modules 38 extracted by the extraction section 60 are replaced with the synthesis module 52 that contains the extracted three image processing modules 38.

Figure 6:
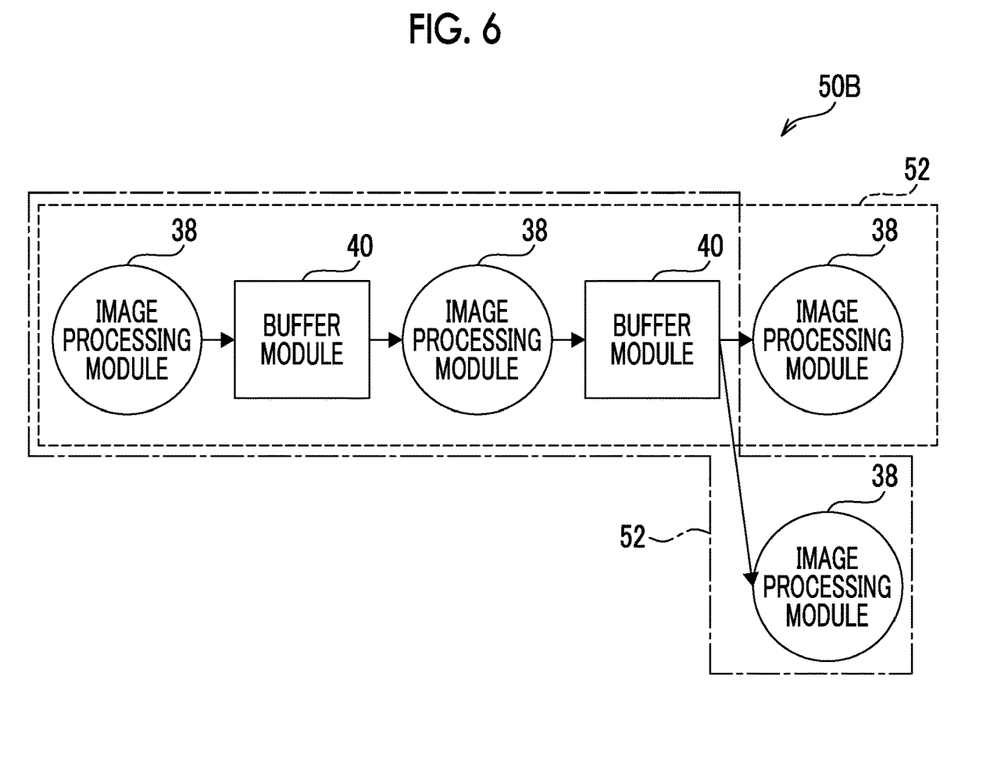
FIG. 6 is a schematic view for illustrating an example of a synthesis module according to an embodiment.

Further, in a case where four image processing modules 38 are connected to each other through the buffer modules 40, as shown in FIG. 6, the extraction section 60 extracts three image processing modules 38 that are surrounded by a dash line in FIG. 6 and are serially connected to each other. Further, the synthesis section 62 constructs the image processing DAG 50B in which the three image processing modules 38 extracted by the extraction section 60 are replaced with the synthesis module 52 that contains the extracted three image processing modules 38. In this case, the extraction section 60 may extract three image processing modules 38 that are surrounded by a single dot chain line in FIG. 6 and are serially connected to each other.

As shown in FIG. 6, in a case where a plurality of sets of a plurality of image processing modules 38 in which a part of image processing modules 38 are disposed in parallel are present in a plurality of image processing modules 38 that are extraction targets of the extraction section 60 and are serially connected to each other, the extraction method of the extraction section 60 is not particularly limited. In this case, for example, the extraction section 60 may randomly extract one image processing module group 38 from the plurality of sets of image processing module groups 38.

Further, in this case, for example, the extraction section 60 may extract an image processing module group 38 of which the number of image processing modules 38 is the largest from the plurality of sets of image processing module groups 38. Further, in this case, for example, a priority may be given to each image processing module 38 in advance, and the extraction section 60 may extract an image processing module group 38 of which a total value of the priorities is the largest from the plurality of sets of image processing module groups 38.

Figure 7:
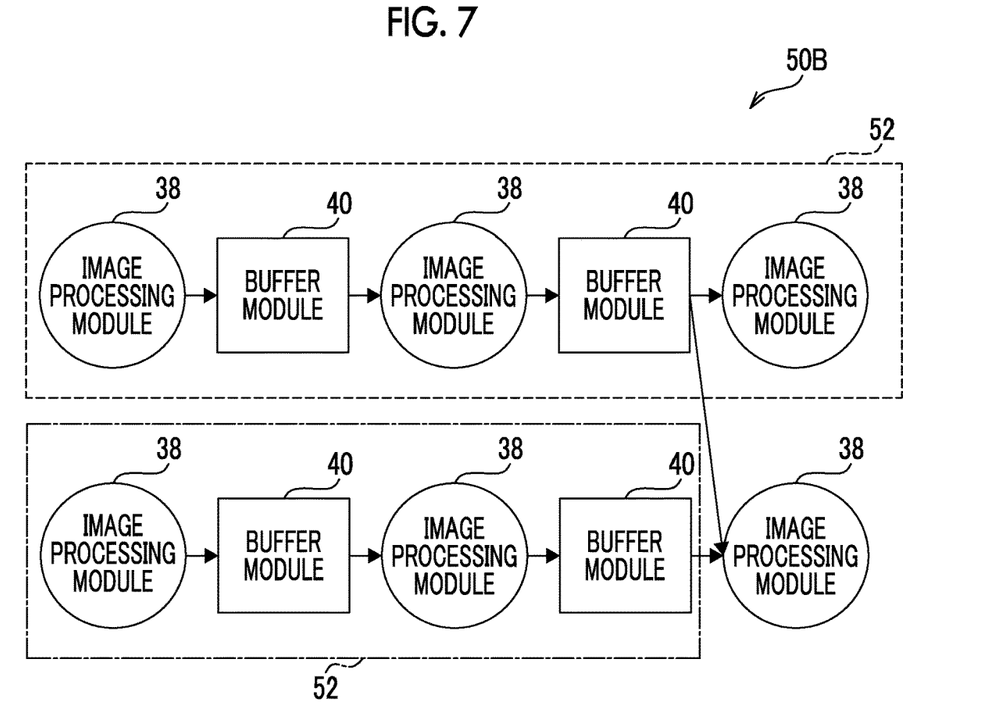
FIG. 7 is a schematic view for illustrating an example of a synthesis module according to an embodiment.

In addition, in a case where six image processing modules 38 are connected to each other through the buffer modules 40, as shown in FIG. 7, the extraction section 60 extracts three image processing modules 38 that are surrounded by a dash line in FIG. 7 and are serially connected to each other. Further, in this case, the extraction section 60 also extracts two image processing modules 38 that are surrounded by a single dot chain line in FIG. 7 and are serially connected to each other. In addition, the synthesis section 62 constructs the image processing DAG 50B in which two sets of image processing module groups 38 extracted by the extraction section 60 are replaced with the synthesis module 52 that contains each extracted image processing module group 38.

Figure 8:
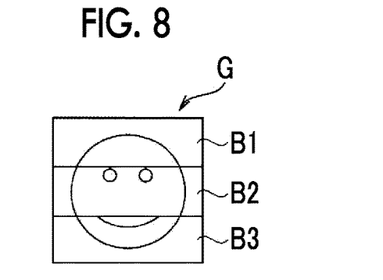
FIG. 8 is a schematic view for illustrating an input image division process.

The division section 64 according to this embodiment divides an image expressed from a part of input image data that is a processing target into a plurality of divided images (divided regions). For example, as shown in FIG. 8, the division section 64 divides an image G expressed from a part of input image data that is a processing target into a plurality of (in the example shown in FIG. 8, three) divided images B1 to B3. Hereinafter, image data indicating divided images is referred to as "divided image data". Further, with respect to the part of the input image data that is the processing target, in the case of image processing in which an entire input image is a processing target as in a color conversion process, the entire input image data becomes the part that is the processing target. In addition, with respect to the part of the input image data that is the processing target, in the case of image processing in which a part of an input image is a target as in a trimming process, the part of the input image becomes the part of the input image. Hereinafter, for ease of description, the part of the input image data that is the processing target is simply referred to as "input image data".

Further, in the example shown in FIG. 8, the division section 64 divides the image G in a vertical direction, but is not limited thereto. For example, the division section 64 may divide the image G in a horizontal direction, or in horizontal and vertical directions.

In this embodiment, the division section 64 divides input image data into a plurality of pieces of divided image data with a number that is equal to or smaller than the number of processor cores that are included in a calculation section (in this embodiment, the second calculation section 12B) that executes image processing in the image processing DAG 50B and is equal to or larger than 2. The division section 64 may divide input image data with a predetermined number or size.

Further, the division section 64 may divide input image data into a plurality of pieces of divided image data having a size that is equal to or smaller than a capacity of a cache memory included in the calculation section that executes the image processing in the image processing DAG 50B. In this case, for example, a configuration in which the division section 64 divides input image data having a size that is equal to or smaller than a capacity of a cache memory of a level that is most distant from a processor of the calculation section that executes the image processing in the image processing DAG 50B, that is, a so-called last level cache (LLC) and matches the capacity of the LLC to the utmost is used.

Figure 9:
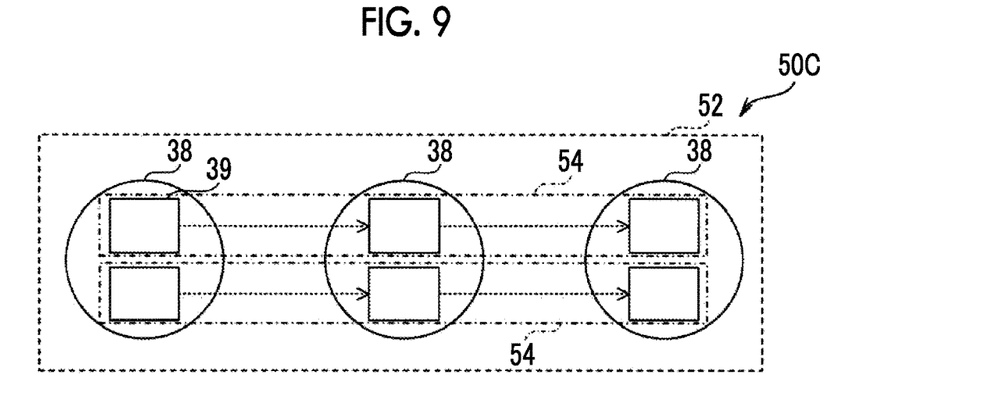
FIG. 9 is a schematic view showing an example of an image processing DAG in which an image processing module is divided into partial processes.
Figure 10:
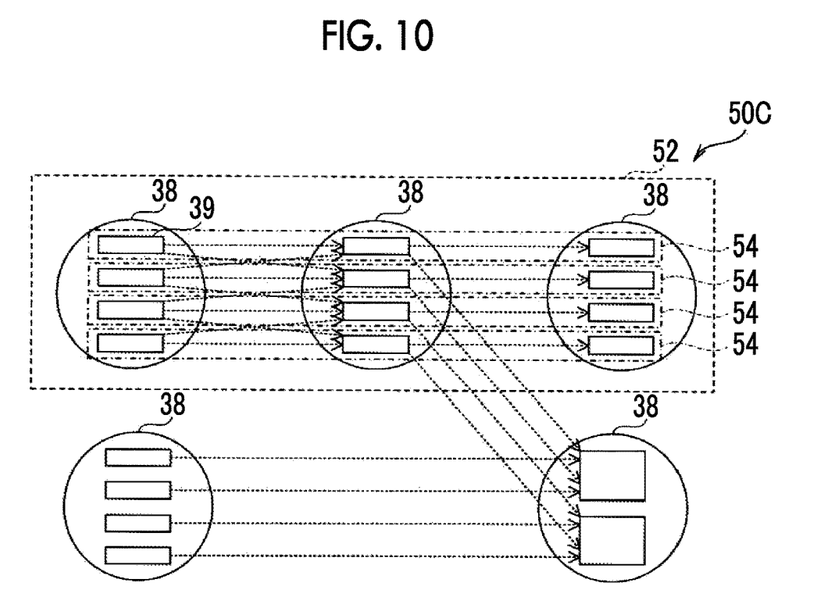
FIG. 10 is a schematic view showing an example of an image processing DAG in which an image processing module is divided into partial processes.

Further, for example, as shown in FIGS. 9 and 10, the division section 64 divides image processing executed by each image processing module 38 into partial processes 39 (tasks) corresponding to each piece of divided image data with respect to the image processing DAG 50B to construct an image processing DAG 50C. FIG. 9 shows the image processing DAG 50C in a case where input image data is divided into two pieces of divided image data in the image processing DAG 50B shown in FIG. 4. Further, FIG. 10 shows the image processing DAG 50C in a case where input image data is divided into four pieces of divided image data in the image processing DAG 50B shown in FIG. 5. In FIGS. 9 and 10, for ease of description, the buffer module 40 is not shown.

Further, the division section 64 assigns a dependency relationship between a partial process 39 of the image processing module 38 connected at a front stage and a partial process 39 of the image processing module 38 connected at a rear stage, in accordance with the type of image processing executed by the image processing module 38. In FIGS. 9 and 10, the dependency relationship is indicated by a dashed arrow.

For example, in a process of performing image processing only with respect to a pixel that is a processing target, such as a color conversion process, each partial process 39 satisfies a one-to-one dependency relationship. On the other hand, for example, in image processing in which peripheral pixels of a pixel that is a processing target are also necessary, such as a filtering process, a dependency relationship is also assigned to a front-stage partial process 39 of performing image processing with respect to the peripheral pixels. Each partial process 39 is executable in a case where a partial process 39 that has a dependency relationship at a front stage is not present or all partial processes 39 that have a dependency relationship are terminated.

The execution section 66 according to this embodiment causes the second calculation section 12B to execute image processing in accordance with the image processing DAG 50C. In this embodiment, the execution section 66 causes the same processor core among a plurality of processor cores in the second calculation section 12B to execute image processing in each of the plurality of image processing modules 38 included in the synthesis module 52. Specifically, in this embodiment, the execution section 66 causes the same processor core to execute image processing in each of the plurality of image processing modules 38 included in the synthesis module 52, in a divided image data unit. Further, the execution section 66 causes a different processor core to execute image processing in each of the plurality of image processing modules 38 included in the synthesis module 52, for each piece of divided image data. Hereinafter, a plurality of partial processes 39 of processing each piece of divided image data in the synthesis module 52 are referred to as a "partial process group 54" (see FIGS. 9 and 10).

For example, in a case where the image processing DAG 50C shown in FIG. 9 is constructed, the execution section 66 causes the same processor core of the second calculation section 12B to execute each of the partial processes 39 included in each partial process group 54. Further, in this case, the execution section 66 causes a different processor core to execute each partial process 39 included in each partial process group 54 between the partial process groups 54. With respect to the image processing module 38 other than the synthesis module 52, the execution section 66 may cause the processor core of the second calculation section 12B to execute each partial process 39 in accordance with a predetermined schedule principle such as a greedy schedule.

The output section 68 according to this embodiment outputs output image data obtained as a result of image processing executed by the image processing module 38 at the final stage of the image processing DAG 50C. In this embodiment, the output section 68 displays the obtained output image data on the display section 16. The output section 68 may output (transmit) the output image data to an external device. Further, in a case where the computer 10 is embedded in a printer, the output section 68 may output (form) an output image expressed from the output image data on a recording material such as a sheet.

Figure 11:
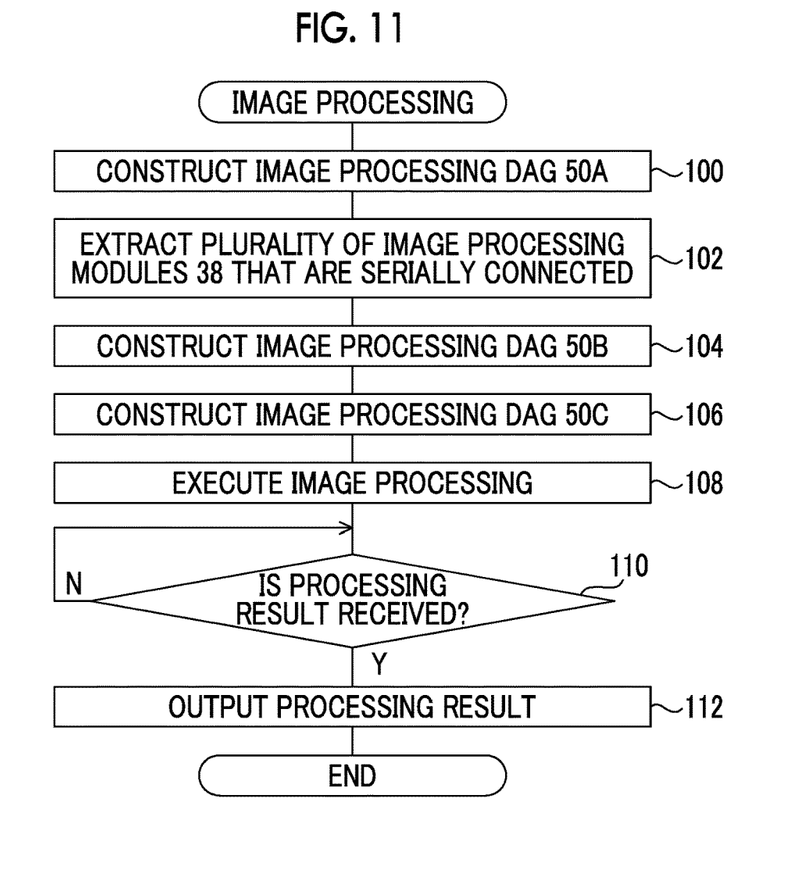
FIG. 11 is a flowchart showing a processing flow of an image processing program according to an embodiment.

Next, an operation of the computer 10 according to this embodiment will be described with reference to FIG. 11. FIG. 11 is a flowchart that shows a processing flow of an image processing program executed by the first calculation section 12A in a case where an instruction for starting execution of image processing is input by the application 32. Further, the image processing program is installed in the storage section 20 in advance. Further, as the first calculation section 12A executes the image processing program, the first calculation section 12A functions as the process construction section 42, the extraction section 60, the synthesis section 62, the division section 64, the execution section 66, and the output section 68.

In step 100 in FIG. 11, the process construction section 42 constructs the image processing DAG 50A in which image processing instructed by the application 32 is performed in accordance with a construction instruction from the application 32. In the next step 102, the extraction section 60 extracts a plurality of image processing modules 38 that are serially connected to each other from the image processing DAG 50A constructed in step 100.

In the next step 104, the synthesis section 62 constructs the image processing DAG 50B in which the plurality of image processing modules 38 extracted in step 102 are replaced with the synthesis module 52 that contains the plurality of extracted image processing modules 38.

In the next step 106, the division section 64 divides input image data into a plurality of pieces of divided image data, as described above. Further, the division section 64 assigns a dependency relationship between a partial process 39 of the image processing module 38 connected at a front stage and a partial process 39 of the image processing module 38 connected at a rear stage, in accordance with the type of image processing executed by the image processing module 38. Through the process of step 106, the division section 64 constructs the image processing DAG 50C.

In step 108, as described above, the execution section 66 causes the second calculation section 12B to execute image processing in accordance with the image processing DAG 50C. The second calculation section 12B stores input image data transmitted from the first calculation section 12A in the local memory 13, and executes image processing in accordance with the image processing DAG 50C. In a case where the image processing in the image processing DAG 50C is terminated, the second calculation section 12B transmits output image data that is finally obtained (that is, output from the image processing module 38 at the final stage of the image processing DAG 50C) to the first calculation section 12A from the local memory 13.

Thus, in step 110, the output section 68 waits for reception of the output image data. In a case where the output section 68 receives the output image data, the determination in step 110 is affirmative, and then, the procedure proceeds to step 112. In step 112, the output section 68 outputs the output image data received in step 110 to the display section 16, and then, the image processing is terminated.

As described above, according to this embodiment, a plurality of image processing modules 38 that are serially connected to each other are extracted from the image processing DAG 50A. Further, the plurality of extracted image processing modules 38 are replaced with the synthesis module 52, and the same processor core executes the synthesis module 52. Thus, the image processing in the image processing modules 38 using image data in the same region as a processing target is executed by the same processor core, and consequently, the frequency of transfer of a thread between processor cores and the frequency of transmission of image data are suppressed. Accordingly, it is possible to perform image processing at high speed, compared with a case where a plurality of types of image processing are executed on different processor cores.

Further, according to this embodiment, since the same processor core executes the synthesis module 52, a hit rate of a cache memory is also enhanced. Accordingly, it is possible to execute image processing at high speed, compared with a case where a plurality of types of image processing are executed on different processor cores.

Further, according to this embodiment, input image data is divided into a plurality of pieces of divided image data, and image processing is executed in a divided image data unit. Thus, the degree that a plurality of types of image processing are executed in parallel is enhanced, and as a result, it is possible to perform image processing at high speed.

In this embodiment, a case where input image data is divided into a plurality of divided image data has been described, but the invention is not limited thereto. For example, a configuration in which input image data is not divided and image processing is performed with respect to the input image data may be used. In this case, as a configuration example, a configuration in which image processing is executed in accordance with the image processing DAG 50B may be used, for example.

Further, in this embodiment, a case where image processing in the image processing DAG 50C is executed by the second calculation section 12B has been described, but the invention is not limited thereto. For example, a configuration in which image processing in the image processing DAG 50C is executed by the first calculation section 12A may be used, or a configuration in which image processing is executed by both of the first calculation section 12A and the second calculation section 12B may be used.

Further, in the embodiment, a form in which various programs are stored (installed) in the storage section 20 in advance has been described, but the invention is not limited thereto. The various programs may be provided in a form of being recorded on a recording medium such as a CD-ROM, a digital versatile disk read only memory (DVD-ROM), or a universal serial bus (USB). In addition, the various programs may be provided in a form of being downloaded from an external device through a network.

This application is based on Japan Patent Application No. 2016-060523, filed on Mar. 24, 2016 in the Japanese Intellectual Property Office, the disclosure of which is incorporated herein by reference.

All documents, patent applications and technical standard written in this specification are incorporated herein by reference to the same degree as in a case where each of the documents, the patent applications, and the technical standards is specifically and individually written to be incorporated by reference.

With regard to the above-described embodiments, the following appendixes will be further disclosed.

(Appendix 1)

An image processing apparatus comprising:

a processor; and a memory storing instructions, which when executed by the processor perform a procedure, the procedure including:

extracting, from an object group in which a plurality of objects for executing image processing are connected to each other in a directed acyclic graph form, a plurality of objects that are serially connected to each other;

dividing an image, which is an execution target of the image processing in the plurality of objects extracted, into a plurality of divided regions;

dividing the image processing into a plurality of tasks corresponding to each of the divided regions;

assigning a dependency relationship in accordance with a type of image processing between a task corresponding to an object connected at a front stage in the plurality of objects that are serially connected to each other, among the plurality of tasks, and a task corresponding to an object connected at a rear stage in the plurality of objects that are serially connected to each other, among the plurality of tasks; and causing a processor core, which is the same processor core, among the plurality of processor cores, and is different among the plurality of tasks, to execute each of the plurality of tasks obtained by being divided.

(Appendix 2)

The image processing apparatus according to Appendix 1, wherein the processor is a circuitry.

What is claimed is:

1. An image processing apparatus that includes a plurality of processor cores, the image processing apparatus comprising:
    an extraction section that extracts, from an object group in which a plurality of objects for executing image processing are connected to each other in a directed acyclic graph form, a plurality of objects that are serially connected to each other;
    a division section that divides an image, which is an execution target of the image processing in the plurality of objects extracted by the extraction section, into a plurality of divided regions, and that divides the image processing into a plurality of tasks corresponding to each of the divided regions, wherein the division section assigns a dependency relationship in accordance with a type of image processing between a task corresponding to an object connected at a front stage in the plurality of objects that are serially connected to each other, among the plurality of tasks, and a task corresponding to an object connected at a rear stage in the plurality of objects that are serially connected to each other, among the plurality of tasks; and
    an execution section that causes each respective processor core, among the plurality of processor cores, to execute a different respective task, among the plurality of tasks into which the division section divides the image processing,
    wherein one task corresponding to one divided region at the rear stage has dependency relationships with another task corresponding to the same divided region at the front stage and with at least one task corresponding to a different divided region at the front stage, and
    the one task corresponding to the one divided region at the rear stage is executed, in a case in which all tasks at the front stage that have the dependency relationships are terminated.

2. The image processing apparatus according to claim 1, wherein the extraction section extracts, as the plurality of objects that are serially connected to each other, a plurality of objects for which a number of objects connected at the front stage is 0 or 1.

3. The image processing apparatus according to claim 1, wherein the execution section, in a unit of the divided region formed by dividing the image that is the execution target of the image processing in the plurality of objects extracted by the extraction section, causes the same processor core to execute image processing in each of the plurality of extracted objects, and causes a different processor core to execute image processing in each of the plurality of objects extracted for each divided region.

4. The image processing apparatus according to claim 3, wherein the division section divides the image that is the execution target of the image processing in the plurality of objects extracted by the extraction section into the plurality of divided regions, a number of the plurality of divided regions being equal to or less than a number of the processor cores.

5. The image processing apparatus according to claim 3, wherein the division section divides the image that is the execution target of the image processing in the plurality of objects extracted by the extraction section into the plurality of divided regions having a size that is equal to or smaller than a capacity of a cache memory included in a calculation section that executes the image processing.

6. The image processing apparatus according to claim 1, wherein the plurality of processor cores include a cache memory used for the image processing.

7. An image processing method using an image processing apparatus that includes a plurality of processor cores, the method comprising:
    extracting, from an object group in which a plurality of objects for executing image processing are connected to each other in a directed acyclic graph form, a plurality of objects that are serially connected to each other;
    dividing an image, which is an execution target of the image processing in the plurality of objects extracted, into a plurality of divided regions;
    dividing the image processing into a plurality of tasks corresponding to each of the divided regions;
    assigning a dependency relationship in accordance with a type of image processing between a task corresponding to an object connected at a front stage in the plurality of objects that are serially connected to each other, among the plurality of tasks, and a task corresponding to an object connected at a rear stage in the plurality of objects that are serially connected to each other, among the plurality of tasks; and
    causing each respective processor core, among the plurality of processor cores, to execute a different respective task, among the plurality of tasks into which the image processing has been divided,
    wherein one task corresponding to one divided region at the rear stage has dependency relationships with another task corresponding to the same divided region at the front stage and with at least one task corresponding to a different divided region at the front stage, and
    the one task corresponding to the one divided region at the rear stage is executed, in a case in which all tasks at the front stage that have the dependency relationships are terminated.

8. A non-transitory computer-readable storage medium storing an image processing program for causing a computer to function as the extraction section, the division section and the execution section of the image processing apparatus according to claim 1.

* * * * *